United States Patent
Zumsteg et al.

(10) Patent No.: US 7,748,934 B2
(45) Date of Patent: Jul. 6, 2010

(54) MACHINE FRICTION TOOL, INTERCHANGEABLE HEAD AND SHAFT

(75) Inventors: Gilbert Zumsteg, Oberkulm (CH); Urs Berner, Aarau (CH)

(73) Assignee: URMA AG, Rupperswil (CH)

( * ) Notice: Subject to any disclaimer, the term of this patent is extended or adjusted under 35 U.S.C. 154(b) by 973 days.

(21) Appl. No.: 10/595,700

(22) PCT Filed: Nov. 5, 2004

(86) PCT No.: PCT/CH2004/000671

§ 371 (c)(1),
(2), (4) Date: May 5, 2006

(87) PCT Pub. No.: WO2005/044498

PCT Pub. Date: May 19, 2005

(65) Prior Publication Data

US 2007/0067979 A1    Mar. 29, 2007

(30) Foreign Application Priority Data

Nov. 6, 2003    (EP) .................................. 03405791

(51) Int. Cl.
*B23D 77/02* (2006.01)
(52) U.S. Cl. ........................ 409/232; 409/234; 279/8; 408/227; 408/233; 408/239 R
(58) Field of Classification Search ................ 409/232, 409/234; 408/144, 227, 231–233, 238, 239 R, 408/239 A; 279/8; *B23B 31/11; B23D 77/00, B23D 77/02*
See application file for complete search history.

(56) References Cited

U.S. PATENT DOCUMENTS

| 1,032,764 | A | * | 7/1912 | Nichols | .................... 33/199 R |
| 1,472,798 | A |   | 11/1923 | Gyllsdorff |   |
| 1,797,296 | A | * | 3/1931 | Ray | .......................... 403/259 |
| 2,164,571 | A |   | 7/1939 | Christman |   |
| 2,164,572 | A |   | 7/1939 | Christman |   |
| 2,164,573 | A |   | 7/1939 | Christman |   |
| 2,303,487 | A |   | 12/1942 | Miller |   |
| 2,369,273 | A |   | 2/1945 | Bakewell |   |
| 2,912,904 | A | * | 11/1959 | Peterson | ...................... 407/48 |

(Continued)

FOREIGN PATENT DOCUMENTS

CH     433916     4/1967

(Continued)

*Primary Examiner*—Daniel W Howell
(74) *Attorney, Agent, or Firm*—Rankin, Hill & Clark LLP

(57) ABSTRACT

A machine reaming tool includes a reaming head or interchangeable head (1) and a shaft (2), wherein the interchangeable head (1) is of one piece and may be exchanged, and in an axial direction and at each location, thus including means for the exchange adaptation, is thinner than a maximal thickness $h_{max}$, wherein this maximal thickness $h_{max}$ is computed in millimeters from a diameter D1 of the interchangeable head in millimeters as $h_{max}=6$ mm$+(1/10)\cdot(D1-12$ mm$)$. On account of this, a guide portion (18) for cutters of the reaming head (1) becomes very much shorter than usual, but despite this ensures an adequate quality of machining. In a preferred embodiment of the invention, the interchangeable head (1) in a plane shaft-side end-face (15) comprises cutout (11) for the centering fastening on the shaft (2).

12 Claims, 8 Drawing Sheets

U.S. PATENT DOCUMENTS

| | | | | |
|---|---|---|---|---|
| 2,937,575 | A | * | 5/1960 | McCoskey .................. 409/232 |
| 3,041,898 | A | * | 7/1962 | Better ........................ 408/238 |
| 3,087,360 | A | | 4/1963 | Garberding |
| 4,166,711 | A | | 9/1979 | Kress et al. |
| 5,163,790 | A | | 11/1992 | Vig |
| 5,599,145 | A | * | 2/1997 | Reinauer et al. ............ 408/233 |
| 5,607,263 | A | * | 3/1997 | Nespeta et al. ................ 407/61 |
| 5,873,687 | A | | 2/1999 | Watanabe |
| 6,896,450 | B2 | * | 5/2005 | Rothenstein ................ 408/59 |
| 2002/0102141 | A1 | | 8/2002 | Meece et al. |

FOREIGN PATENT DOCUMENTS

| | | | |
|---|---|---|---|
| CH | 599820 | A5 * | 5/1978 |
| DE | 19600239 | | 4/1997 |
| DE | 202004009549 | | 8/2004 |
| EP | 1090705 | A2 * | 4/2001 |
| EP | 1316375 | | 6/2003 |
| JP | 05-345221 | | 12/1993 |
| JP | 5345221 | | 12/1993 |
| JP | 07-040141 | | 2/1995 |
| JP | 7040141 | | 2/1995 |
| JP | 10249624 | A * | 9/1998 |
| JP | 10309616 | A * | 11/1998 |
| JP | 2002059314 | | 2/2002 |
| WO | WO 9725173 | A1 * | 7/1997 |
| WO | 9921674 | | 5/1999 |
| WO | 0164381 | | 9/2001 |

* cited by examiner

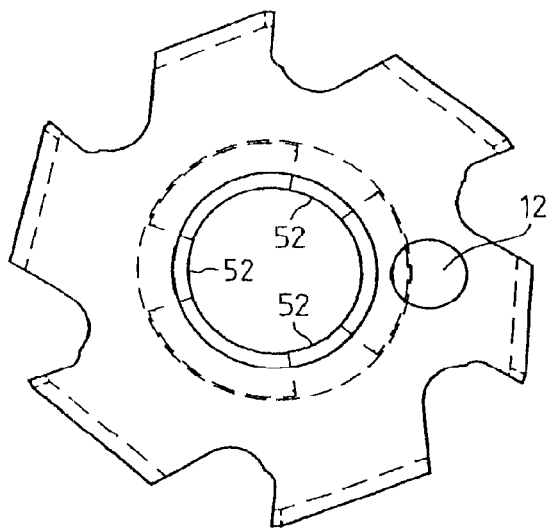
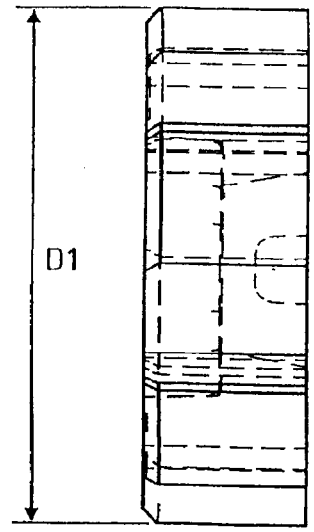
Fig. 6A
Fig. 6B
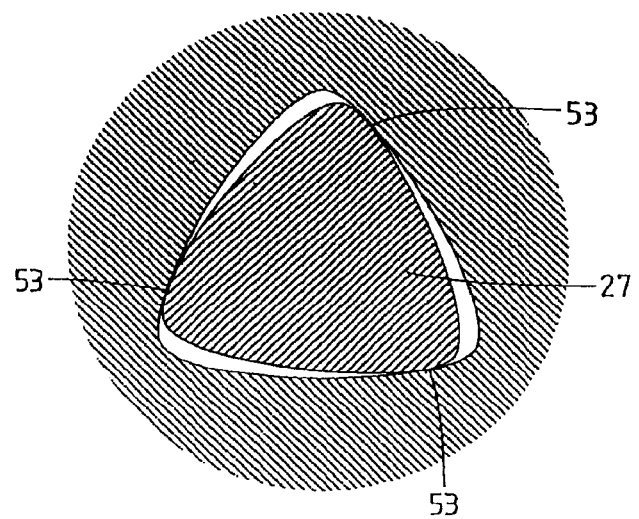
Fig. 10

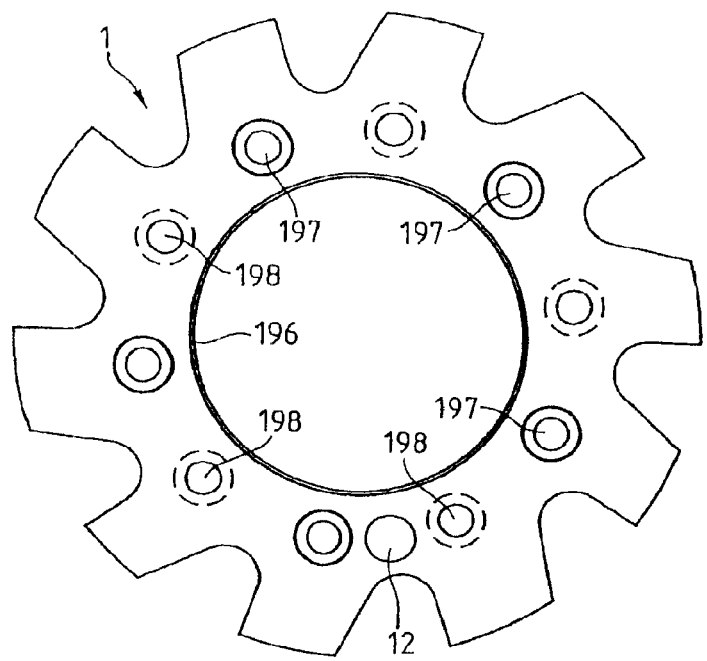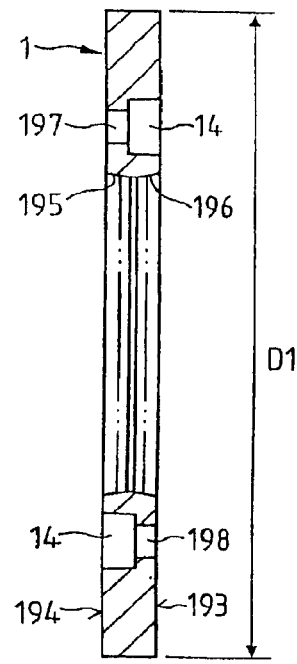
Fig. 12A  Fig. 12B
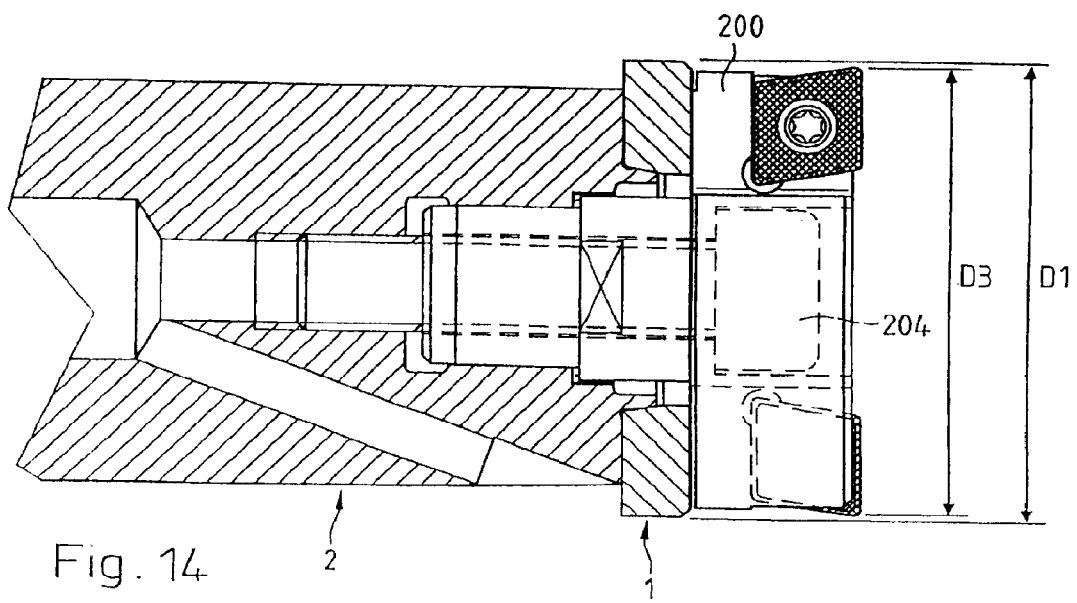
Fig. 14

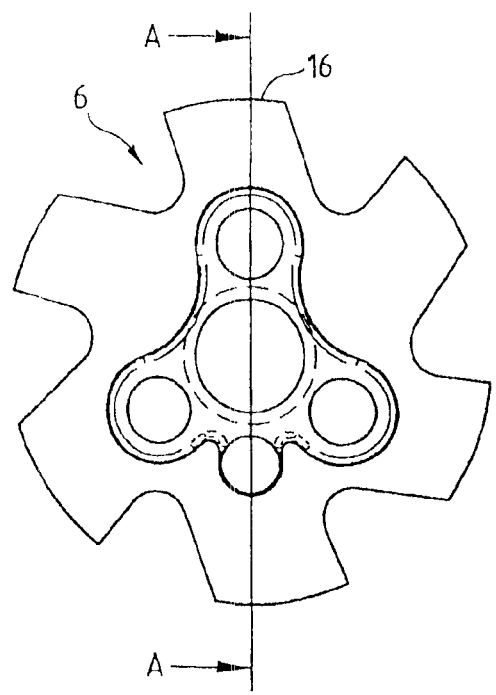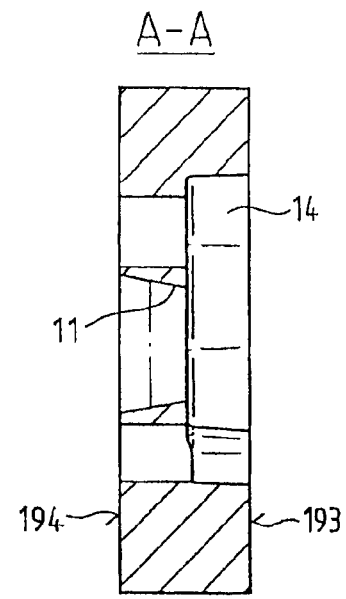
Fig. 16A  Fig. 16B
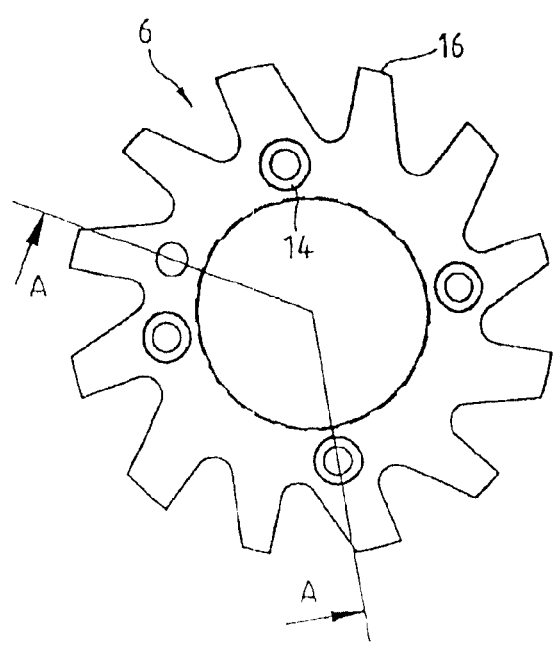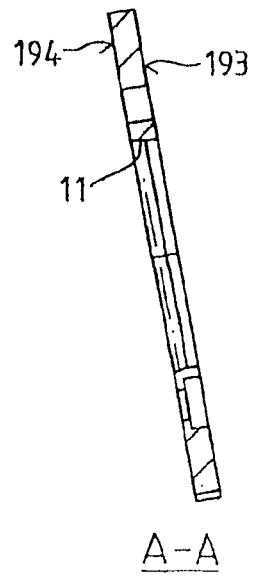
Fig. 17A  Fig. 17B

MACHINE FRICTION TOOL, INTERCHANGEABLE HEAD AND SHAFT

BACKGROUND OF THE INVENTION

1. Field of the Invention

The invention relates to a machine reaming tool, to an interchangeable head and to a shaft for a machine reaming tool, as well as to a method for the use of an interchangeable head.

2. Description of Related Art

Machine reaming tools or machine reamers are used for precision machining cylindrical bores. Individual cutters, in each case, comprise a main cutting edge or leading cut portion, and a secondary cutting edge or guide portion. The leading cut portion performs the material removal work, and the guide portion serves for guiding the tool in the bore. In order to ensure reliable guiding in all machining conditions, for example 10 millimeters or more, with a diameter, for example, of approximately 15millimeters.

A machine reamer is known from WO 01/64381 A2 which has a base body and an interchangeable head, that is to say an exchangeable reaming head. The reaming head is formed as one piece and comprises a lug for exchange adaptation, projecting beyond a rearward plane surface in the axial direction. This projecting lug is either designed in a pyramid-like manner or as a cone. On connection to the base body, the lug is inserted into a corresponding sinking of the base body, wherein clamping tabs are expanded, the tabs being separated from one another or from the remaining shaft by separating gaps or by way of expansion slots. With conical connections, additionally a hexagonal projection is formed on the reaming head and a corresponding hexagonal socket is formed on the base body, for improving the torque transmission.

U.S. Pat. No. 1,472,798 shows a reaming head with which a collar may be exchanged with the leading cut portion and a part of the guide portion, whilst the remainder of the guide portion continues to be applied.

A reaming body is shown in the Patent Abstracts of Japan in JP 07 040141, on whose front end an exchangeable head is assembled. For this, the reaming body comprises a projecting, slotted cylinder, onto which the exchangeable head is placed. The slotted cylinder is pressed on by way of a conical screw and, thus, firmly holds the head.

U.S. Pat. No. 4,166,711 and U.S. Pat. No. 2,303,487 show further fastening types for exchangeable tool heads.

U.S. Pat. No. 2,164,573 shows thin reaming heads, which are punched from sheet metal or may be sawn from a toothed rod. This necessitates the use of comparatively soft steels. A flexible steel is also necessary for one of the embodiments, with which the teeth are bent on machining. For this reason, one may only expect a limited accuracy of machining, particularly with the disclosed, relatively thin teeth.

A flat reaming head is described in U.S. Pat. No. 2,164,571, which may be operated in both rotational directions. The reaming head may also turned over and be used with the same rotational direction of the shaft. For this however, a large number of small teeth lying close to one another must be present, and the teeth must be ground equally on both sides along the periphery of the interchangeable head. The individual teeth in each case therefore are symmetrical and comprise two cutting edges, one for each rotational direction. The geometry of the cutting edges—with a negative rake angle—does not however permit any reaming, but a scraping machining at best.

U.S. Pat. No. 5,163,790 shows a conical mounting, wherein the conical projection comprises three cutouts. On pressing together, the conical projection is pressed apart at the locations which are not relieved and contracts at the cutouts. A fixation of a shaft in a region above the cone connection is achieved by way of this.

U.S. Pat. No. 3,087,360 describes a movable connection between the shaft and reaming head, which compensates positioning inaccuracies.

BRIEF SUMMARY OF THE INVENTION

It is the object of the invention to provide a machine reaming tool, an interchangeable head and a shaft for a machine reaming tool of the initially mentioned type, which permits a material saving and, thus, inexpensive manufacture of reaming heads. A further object of the invention is to permit a simplified design of the mentioned parts of a machine reaming tool.

These objects are achieved by the subject-matters of the respective independent patent claims.

The machine reaming tool according to the invention comprises a reaming head or an interchangeable head and a shaft according to the invention. The interchangeable head, according to the invention, thereby is of one piece and exchangeable, wherein, in the axial direction, it has a thickness of less than $h_{max}$ millimeters at every location, thus including a means for exchange adaptation, wherein this thickness $h_{max}$ is computed from a diameter D1 of the interchangeable head in millimeters as $$h_{max} = 6\text{ mm} + 1/10(D1-12\text{ mm}).$$

In a preferred embodiment of the invention, $h_{max}$ (for D1 smaller than 12 mm) is at least 6 mm and (for D1 larger than 35 mm) is 8 mm at the most. In a preferred embodiment, $h_{max}$ is equal to 6 mm independently of the diameter D1.

Accordingly, a guide portion on individual cutters of the interchangeable head is also somewhat shorter than $h_{max}$. This design of the interchangeable head is based in the recognition that a common, comparatively long guide portion of the cutter is not necessary at all in many cases of application. By way of this, the interchangeable head, may be manufactured in a material-saving manner, even with smaller thickness, for example below 5 mm, 4.5 mm, 4 mm, 3.5 mm, 3 mm, 2.5 mm or 2 mm.

In a preferred embodiment of the invention, the interchangeable head, as a connection element, comprises a cutout in a plane end-face on the shaft side, for the centering fastening on the shaft. The shaft has no machining means such as teeth or cutters, and has a smaller outer diameter than the interchangeable head. The shaft is preferably of one piece, and on an end-side plane surface comprises a connection lug which projects out of this plane surface in the axial direction and which corresponds to the cutout of the interchangeable head. The interchangeable head thus has no axially projecting lug for exchange adaptation. The material requirement on the interchangeable head is further reduced, and the manufacture of the interchangeable head is simplified by way of this.

With the conventional connection type, the projecting lug of the hard interchangeable head expands the comparatively soft shaft of the base body, wherein this expansion is favored by a separating gap. In contrast to this, according to the invention, an inner surface or several points of the cutout of the hard interchangeable head press the projecting lug of the shaft together. This compression of the shaft material is effected with an axially centered arrangement of the connection elements in essentially the radial direction. The compression, with regard to the material displacement, requires comparatively higher forces than the expansion of the shaft material according to the state of the art. Accordingly, according to the invention, greater manufacturing accuracies are required as the case may be. Advantageously, in contrast to the expansion, the planarity of the end-side surface of the shaft is not negatively influenced.

In other words therefore, the interchangeable head comprises two parallel, plane end-faces with an axial distance of less than approximately 6, preferably less than 5 or less than or equal to 4 millimeters, and without an exchange adaptation projecting beyond these end-faces. A plane end-face on the shaft side comprises a recess or sinking which projects into the end-face, and into which a corresponding, projecting part of the shaft may be inserted. With this insertion, thus when the interchangeable head is pressed against the shaft in the axial direction, this projection is pressed together or compressed or inwardly deformed along its complete periphery or at least three locations, by way of the interchangeable head.

More than one centering recess in the interchangeable head and accordingly more than one lug on the shaft is possible in other embodiments.

In a preferred embodiment of the invention, the cutout in the end-face of the interchangeable head is a conical socket and accordingly the projecting lug on the shaft is a corresponding conical projection. The dimensions of the conical socket and conical projection are preferably matched to one another such that on placing the interchangeable head onto the shaft, the end-face plane surface of the shaft and the oppositely lying end-side of the interchangeable head have a predefined distance. For fastening the interchangeable head, at least one cap screw is guided through at least one bore in the interchangeable head, and is screwed in the shaft. On tightening the cap screw or the head screws, the conical projection of the shaft is pressed together by the conical socket of the hard interchangeable head, until the end-side plane surface of the shaft and the oppositely lying end-side of the interchangeable head meet one another. A frictional connection arises on account of the pressing-together of these two end-faces. It has been shown that this connection is sufficient for the transmission of torque in normal operation, even with the use of a single, axially centered cap screw. Thus a pure cone connection may be used, without polygonal force transmission means such as triangular or hexagonal connections for example. The manufacture of the interchangeable head as well as of the shaft is simplified by way of this.

The conical projection or the conical socket comprise several, preferably three, slightly projecting or exposed segments. When the reaming tool is assembled, these form contact surfaces between the shaft and the interchangeable head, and thus a three-point contact for example. On manufacture, only these segments need to be manufactured with a high accuracy, for example ground, and not the complete conical periphery.

In another embodiment of the invention, the cutout in the end-face of the interchangeable head, which cutout is designed as a connection element, is essentially circularly cylindrical and at three locations of the inner cylinder periphery in each case comprises a contact segment or a contact point, at which the cutout is designed somewhat more narrowly. In the peripheral direction, these locations are distributed distanced from one another over the periphery. Accordingly, the projecting lug, designed as a connection element on the shaft, is likewise essentially circularly cylindrical.

In a preferred variant of this embodiment, the contact segments are formed by plane surfaces. An extension of one of the contact segments in the peripheral direction is comparatively larger than the extension of the two other ones, preferably one and a half to twice as large. By way of this, this contact segment acts as a catch segment. In a manner corresponding to this, the shaft on a part segment of the periphery comprises a plane surface, said part segment or sector encompassing, for example, up to one eighth of the periphery. The catch segment also acts as a rotational securement. The orientation of the interchangeable head when placed on the shaft is fixed in an unambiguous manner, since the catch segment must be accordingly orientated to the plane surface on the shaft. Furthermore, the catch segment effects a positive-fit force transition onto the interchangeable head, and as the case may be, a locking of the interchangeable head and shaft on rotation. The interchangeable head, analogously to that described above, is screwed to the shaft by way of one or more preferably sunk screws, and pressed onto the end-side of the shaft.

The cylindrical shape of the connection elements on the interchangeable head and shaft permit a simple and inexpensive manufacture, with a sufficient exchange accuracy of the connection.

In further embodiments of the invention, the connection elements in the interchangeable head and shaft are rounded polygon cylinders, preferably triangular cylinders which are rounded along the periphery. The outer cylinder on the shaft is slightly smaller than the inner cylinder on the interchangeable head, so that three contact points form on the periphery of the cylinder when attaching the interchangeable head onto the shaft and a small mutual rotation. The polygon cylinders are either shaped asymmetrically, or the polygon cylinders, as described below, on the end-faces to be pressed onto one another, comprise corresponding recesses and projecting elements, as an orientation means for orientation of the interchangeable head in the peripheral direction.

The centering cutout in the interchangeable head with all embodiments, is not compellingly central and continuous. With the use of exactly one cap screw however, the cutout is arranged centrally or axially centrally in the interchangeable head and forms a through hole. The cutout on the end-face of the interchangeable head, which is distant to the shaft, then preferably forms a cutout for a screw head. The screw head may be sunk in the interchangeable head by way of this. In turn, the machining depth in a pocket hole may be maximised by way of this.

In a further preferred embodiment of the invention, the shaft and the interchangeable head comprise corresponding means for the unambiguous orientation of the interchangeable head with respect to the shaft in the peripheral direction. The orientation means on the interchangeable head, for example, is a sinking or a hole in the end-face facing the shaft, and the corresponding orientation means on the shaft is a projection or a pin. These orientation means ensure that the high demands placed on the truth of running characteristics of the reamer are also met on exchange of the interchangeable head. The reaming heads on manufacture are ground on the same machine tool, wherein the orientation of the reaming heads with respect to the orientation means is the same in each case. A machine which applies the reaming heads, when setting up with a new reamer, must be trued concentrically in the micrometer range. If then the interchangeable head of the reamers is exchanged, then no renewed concentrically truing is necessary thanks to the orientation means. The orientation means also contribute to the force transmission to the interchangeable head, on account of their positive fit.

The interchangeable head, along its peripheral direction, comprises several cutters or cutting teeth, which are distanced to one another. Each cutter comprises a leading cut portion and a guide portion. A leading cut portion in the axial direction preferably has a length of 0.03 mm to 1.2 mm, in particular of approximately 0.3 to 0.7 mm. The length of the cutter remaining up to the thickness of the interchangeable head forms the guide portion. A ratio between the length of the leading cut portion and the length of the guide portion of 1:7 results for an average length of the leading cut portion of 0.5 mm and an interchangeable head thickness of 4 mm. This ratio is preferably between 1:6 and 1:10, which are comparatively large values compared to the maximal usual values of 1:20 for example. The large values result from the low thickness of the interchangeable head. This in turn is possible, amongst other things, thanks to the recognition that the greater part of all applications does not place particularly exacting demands on the guiding of the reamers.

The point between the leading cut portion and the transition region is hereinafter called the effective cutting corner or reaming corner. Proceeding from this point, the guide region tapers slightly to the rear, so that the reaming corner is the point of the cutter with the largest radius, and thus also determines the radius or diameter of the machined hole. Here and in the following, "front" in each case indicates the side of the interchangeable head which is distant to the shaft, and "rear" indicates the opposite side.

In a preferred embodiment of the invention, an interchangeable head is designed as a reversible (or indexable) insert. The interchangeable head thus comprises a first side and an oppositely lying second side, and may be selectively assembled with the first or the second side against the shaft, and may be used for reaming in both cases. The first or the second side, for example with a plane surface and a centering cone, are held or pressed against the corresponding surfaces of the shaft by way of connection means such as screws or tie rods.

With this, it is possible in a first phase to firstly assemble and use the interchangeable head with the one side as the rear side against the shaft, until the cutters, in particular the reaming corners, are worn on the front side. Subsequently, the interchangeable head is indexed for a second phase, which means the other side becomes the rear side and the leading cut portion and reaming corners which hitherto were located at the rear, then come to the front side. The rotational direction must, of course, be reversed during the machining for this. Surprisingly, no significant wearing of the rear reaming corners takes place in the first phase, although these at first have the same radius as the front reaming corners, and after a certain wearing of the front reaming corners, even have a larger radius.

Thus in each case, it is the other side of a cutting edge of a tooth which is worn after reversing the interchangeable head. No second cutting edge per tooth is required in order to be able to operate with the reversible interchangeable head. The teeth are, thus, asymmetrically shaped along the periphery or with a direction viewed parallel to the rotational axis.

The reversible interchangeable head comprises centering means and fastening means for both fastening directions. For example, two coaxial conical sockets are present in place of the conical socket described above. Each of the conical sockets proceeds from one of the two plane surfaces and extends up to the middle of the interchangeable head, where the two conical recesses meet one another. As an alternative to this, the conical sockets do not extend to the middle, but are connected by a bore for a central fastening element.

In the case of a cylindrical instead of a conical recess, this is designed such that it has at least one mirror symmetry with respect to a plane perpendicular to the plane of the interchangeable head.

The fastening means are, for example, one or more continuous bores with cutouts on both sides for screw heads, or two separate sets of bores, wherein the one set has such cutouts on the one side of the interchangeable head, and the other set has cutouts on the other side. A design without cutouts is also conceivable.

The guide portion between the two reaming corners in each case of one cutter is preferably tapered towards the middle of the cutter. This taper may for example be V-shaped or circular-arc-shaped, corresponding to a hollow grinding. The tapering of the diameter towards the oppositely lying side is small and lies in the region of a hundredth of a millimeter per 10 mm in the axial direction. In a preferred embodiment of the invention, a groove or notch is arranged in the cutter roughly in the middle between the tapers. The manufacture of the two tapers which run towards one another, is simplified by way of this. What is surprising is the fact that an adequate guiding during the machining with the interchangeable head takes place even with such a short and possibly interrupted guide region.

In a further preferred embodiment of the invention, the thin design of the interchangeable head permits it to be combined with a second machining tool which is fastened on the same shaft. This second tool is a pre-machining tool, for example, such as a planisher with a slightly smaller diameter than the interchangeable head. On application of such a combined tool, the planisher produces a first inner radius corresponding to a pre-machining diameter or predetermined size in a present bore, and the reaming head produces a slightly larger inner radius corresponding to the finished dimension of the bore, in one working procedure. The planisher and the interchangeable head are preferably fastened on the shaft with separate fastening means, or however by way of a single, common fastening means, a concentric screw for example. The shaft comprises corresponding fastening means for the interchangeable head and the second machining tool. The total height of the combined tool is small and the fact that this may be applied at all in restricted spatial conditions is due to the reduced thickness of the interchangeable head.

In yet a further preferred embodiment of the invention, which may likewise be utilised thanks to the slim design of the interchangeable head, the preferred single-piece interchangeable head is designed as a reaming tool as well as a milling tool. For this, in each case, the front side of a cutter is primarily designed for reaming, as described above, and additionally the leading cut portion on the rear side is designed as a chamfer miller. The leading cut portion is preferably also designed larger on the front side than would be required merely for reaming, and on account of this, the front leading cut portion may also be used as a chamfer miller. A circular movement of the tool axis takes place (circular milling or interpolating milling) takes place on milling a chamfer at the entry or exit of a bore.

With the use of the last mentioned embodiment of the invention, a machining method is implemented with the following steps milling a chamfer at the entry of a bore by way of the leading cut portion on the front side of the cutters;

reaming the bore to a nominal dimension by way of the leading cut portion and above all the reaming corner on the front side of the cutters;

milling a chamfer at the exit of the bore by way of the leading cut portion on the rear side of the cutters; and leading the tool back through the bore, wherein any occurring burr material which has arisen with the previous step is removed.

Thanks to the combination of machining functions in a single, one-piece and thin interchangeable head according to the invention, one may implement the described machining steps also with restricted spatial conditions, without tool exchange and in one production step.

Various combinations of the embodiments described above are possible. The following are mentioned, which are not conclusive: The combination of chamfer milling and reaming may also be realised with a reversible insert. One may also apply a cutter for chamfer milling on the rear side of an interchangeable head which is applied combined with a planisher.

The described interchangeable heads are preferably manufactured from a material manufactured by sintering, such as hard metal, cermet, ceramic (e.g. silicon ceramic or ceramic insert or oxide ceramic) or CBN (cubic boron nitride).

BRIEF DESCRIPTION OF THE DRAWINGS

The subject-matter of the invention is hereinafter described in more detail by way of preferred embodiments which are shown in the accompanying drawings. There are schematically shown in:

FIGS. 4A and 4B, 5A and 5B, 6A and 6B in each case, corresponding views of interchangeable heads according to various embodiments of the invention;

FIG. 10 connection elements of the interchangeable head and shaft, in a further embodiment of the invention;

FIGS. 12A and 12B a lateral view in a cross section and a plan view of a reversible insert according to FIGS. 11A and 11B;

FIG. 14 a shaft with an interchangeable head and pre-machining tool;

FIGS. 16A and 16B and 17A and 17B in each case, corresponding views of interchangeable heads according to further embodiments of the invention.

The reference numerals used in the drawings and their significance are summarily listed in the list of reference numerals. Basically, the same parts are provided with the same reference numerals in the figures.

DETAILED DESCRIPTION OF THE INVENTION

Figures 1, 2, 3:
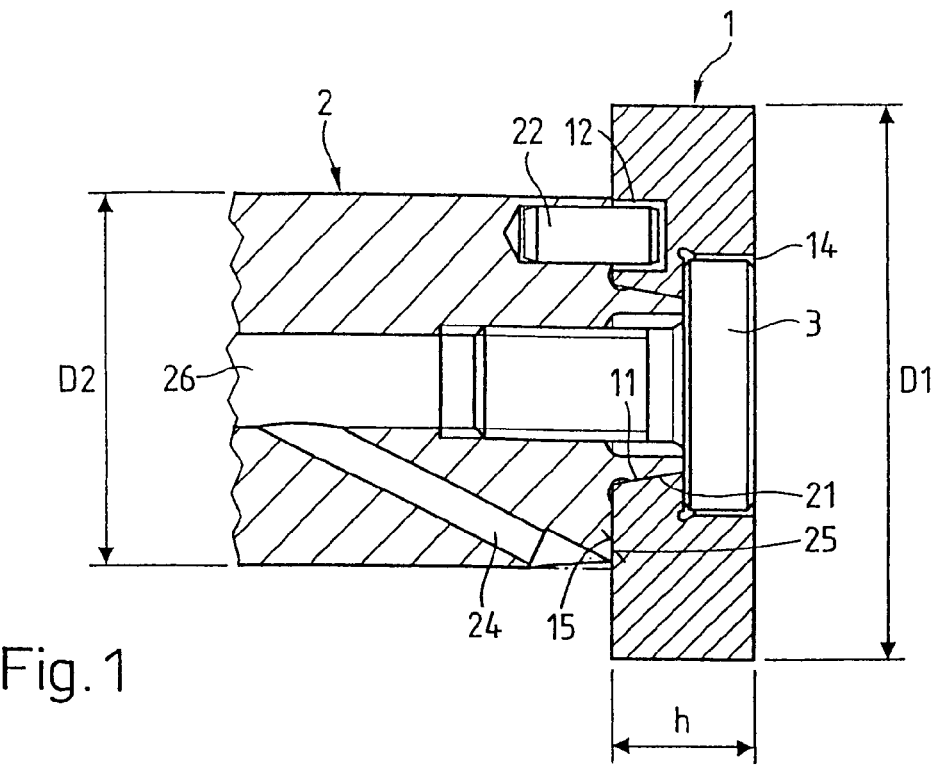
FIG. 1 a longitudinal section through a head region of a machine reaming Tool according to the invention.
FIG. 2 a longitudinal section through a head region of a shaft of a machine reaming tool according to the invention.
FIG. 3 a shaft according to the invention.

FIG. 1 shows a longitudinal section through a head region of a machine reaming tool according to the invention. An interchangeable head 1 is screwed onto a shaft 2 by way of a cap screw 3 running centrically in the axial direction. The cap screw 3 is sunk in a pocket 14. The interchangeable head 1 for orientating the interchangeable head 1 in the peripheral direction, comprises an orientation hole 12 and the shaft 2 comprises an orientation pin 22 which projects into the orientation hole 12. The shaft 2 comprises an axial bore 26 from which coolant channels 24 on the tool-side end lead to the outer side of the shaft 2 in the proximity of the interchangeable head 1. An improved cooling of the cutting parts is ensured on account of the proximity of the coolant exit to the interchangeable head 1 and the small thickness h of the interchangeable head. A shaft-side plane surface 15 of the interchangeable head 1 is pressed onto an end-side plane surface 25 of the shaft 2 by way of screwing. Thereby, connection elements which in the present embodiment of the invention are a conical socket 11 of the interchangeable head 1 and a conical projection 21 of the shaft 2, are pressed onto one another. Since the material of the interchangeable head 1 has a lower deformability that that of the shaft 2, thereby the conical projection 21 is inwardly deformed in the radial direction within its material elasticity and is compressed or compacted.

Figure 5A:
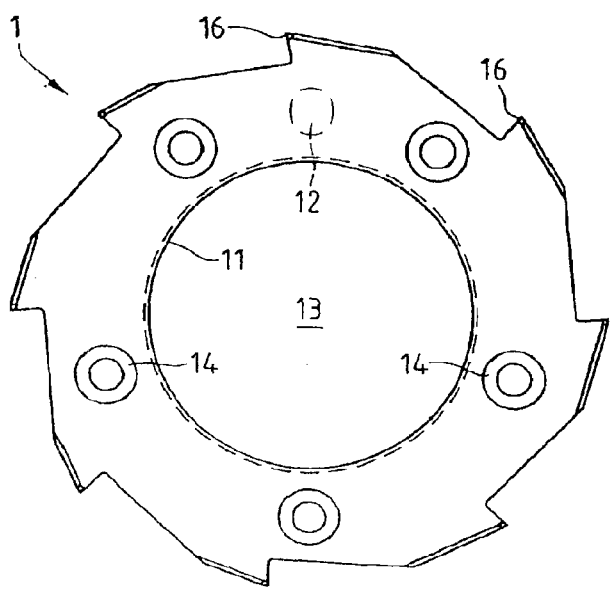
Figure 5B:
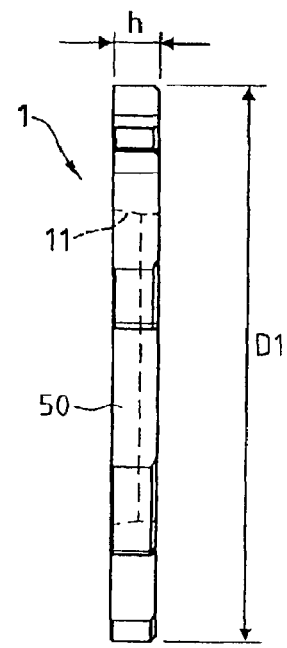

The interchangeable head 1 has a diameter D1 between for example 10 mm and 60 mm, wherein an embodiment with a fastening of the interchangeable head 1 according to FIG. 5 is preferred for higher values. The shaft 2 has a diameter D2 which is at least a few millimeters smaller than that of the interchangeable head 1.

A thickness h of the interchangeable head 1 in the axial direction, thus in the direction of the rotational axis of the tool, is preferably for example less than 6 mm or 5 mm, in the present example is 4 mm, with a diameter D1 between 10 mm and 60 mm or more. The conical socket 11 projects, for example, up to a depth of 2 mm into the interchangeable head 1. Accordingly, the conical projection 21 projects approximately 2 mm beyond the end-side plane surface 25 of the shaft 2. The dimensions of the conical socket 11 and of the conical projection 21 are matched to one another, so that a predefined small air gap arises between the shaft-side plane surface 15 of the interchangeable head 1 and the end-side plane surface 25 of the shaft 2, with the loose assembly. These surfaces are pressed together on tightening the cap screw 3, and a controlled, predefined deformation of the conical projection 21 occurs on account of the predefined size of the air gap.

FIG. 2 shows a longitudinal section through a head region of a shaft of a machine reaming tool according to the invention. The shaft, or at least the head region, is preferably designed as one piece. The axial bore 26 is designed in a continuous manner and at its tool-side end has a thread 23. The axial bore 26 in the region of the conical socket 11 has a diameter which is increased with respect to the threaded bore 23. On account of this, a free region for deformation of the conical socket 11 remains between the material of the conical socket 11 and the cap screw 3. The orientation pin 22 is pressed into a bore in the shaft 2. In principle, the orientation pin may be arranged on the exchangeable cutting tip 1, and the corresponding orientation hole on the shaft 2. This embodiment, however, is slightly more complicated in manufacture, particularly since the interchangeable heads 1 must be exchanged more often than shafts 2.

FIG. 3 shows a shaft 2 according to the invention. The shaft 2 on the machine side, thus, at its end which is distant to the tool 1, is envisaged for chucking into a machine. For this, it is, for example, of a circularly cylindrical shape or comprises standard chucking surfaces. Exemplary dimensions are a shaft length of 80 mm and a shaft diameter D2 of 10 mm with reaming head diameters of 11 mm to 16 mm, or a shaft length of 110 mm and a shaft diameter D2 of 16 mm with reaming head diameters of 18 mm to 24 mm. Preferably, no guide portion for guiding the shaft in the bore hole is formed on the shaft itself.

Figure 4A:
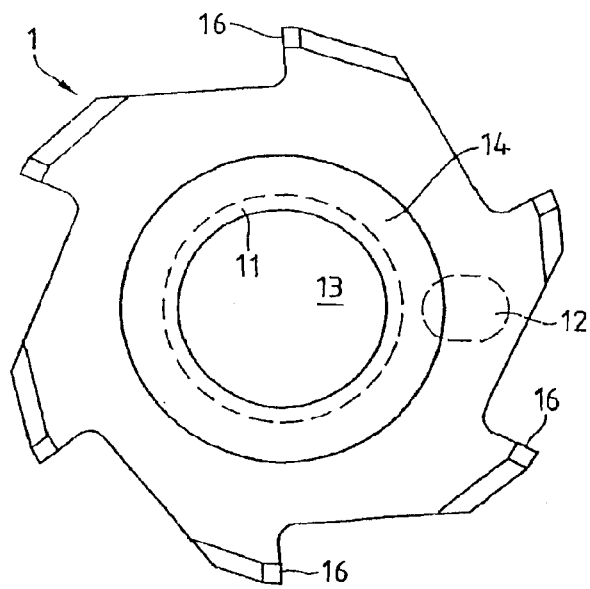
Figure 4B:
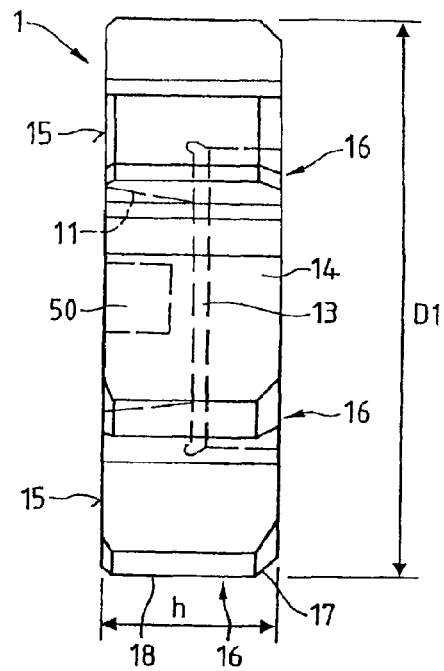

FIGS. 4, 5 and 6 in each case show corresponding views of interchangeable heads according to various embodiments of the invention. FIG. 4 shows an embodiment with a central cap screw 3 according to the FIGS. 1 to 3. A continuous recess 50, 13, 14 on the shaft side is formed as a cutout 50 or conical socket 11, on the oppositely lying side as a pocket for screw head 14, and therebetween as a bore 13, respectively.

Figure 7:
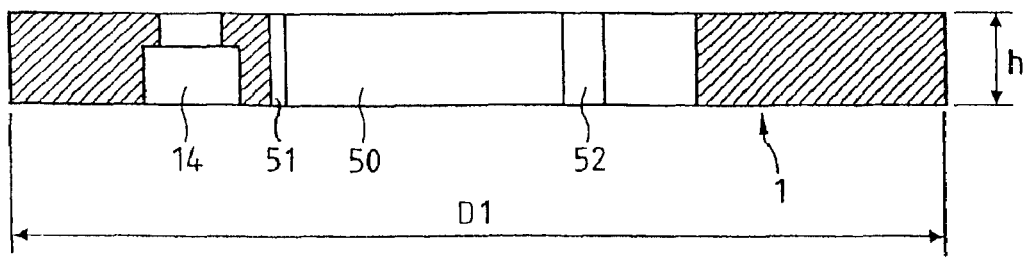
FIGS. 7 and 8 sections through an interchangeable head in a further embodiment of the invention.

In contrast to the FIGS. 1 and 7, in which the periphery of the interchangeable heads is only shown schematically according to the shape of the semi-finished product, the periphery is shown more accurately in the FIGS. 4, 5 and 6. The interchangeable head 1 comprises several cutting teeth with cutters 16, which are distributed in the peripheral direction. A cutter leads in the axial direction from a first to a second plane end-face of the interchangeable head 1. The end-faces delimit the interchangeable head 1 in the axial direction and run perpendicularly to the axial direction and at a distance h parallel to one another. A cutter 16 comprises a leading cut portion 17 and a guide portion 18. The guide portion is comparatively short so that the distance h is also comparatively short. Despite the very short guide portion 18, a useful application of the machine reaming tool according to the invention is possible in most cases of application.

FIG. 5 shows a preferred embodiment of the invention, in which several continuous bores in each case with a pocket for a screw head 14, are arranged concentrically about a central bore 13. An adequate fastening and torque transmission is ensured by way of this, even with those annular interchangeable heads 1 with a larger diameter. Since with this embodiment, the pockets for the screw heads 14 and the connection elements such as conical socket 11 are arranged next to one another and not on the same axis, the maximal thickness h1 may even be less than 3 mm or 2 mm.

FIG. 6 shows a further preferred embodiment of the invention in which the concical socket 11 comprises three contact segments 52 which are exposed, which means to say that the remaining regions of the conical socket have a slightly larger inner radius. The contact segments 52 are distributed distanced to one another in the peripheral direction and uniformly over the periphery. On manufacture, only the surfaces of these contact segments 52 may be manufactured or ground with a high accuracy.

Figure 8:
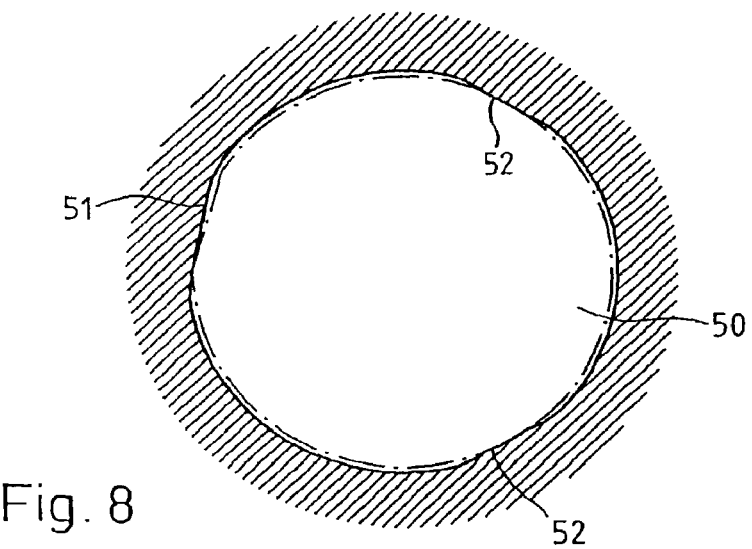

FIGS. 7 and 8 show sections through an interchangeable head 1 in a further embodiment of the invention. In this, as also in FIG. 9, the connection elements 27, 50 are shaped essentially cylindrically. FIG. 7 shows a cross section parallel to the axial direction and FIG. 8 a cut-out of a cross section perpendicular to the axial direction. A cutout 50 acting as a connection element is mainly shaped in a circularly cylindrical manner, but has three contact segments 51, 52. With each contact segment 51, 52, the inner wall of the circular cylinder is plane over a sector of the circle. An extension of such a sector corresponds roughly to a fifth to half the cylinder diameter. With a cylinder diameter of approximately 17 mm, this for example corresponds to 2 mm to 4 mm. Preferably, one of the contact segments 52 is significantly larger in the peripheral direction, for example, double as large as the others and therefore acts as a catch segment 51.

Figure 9A:
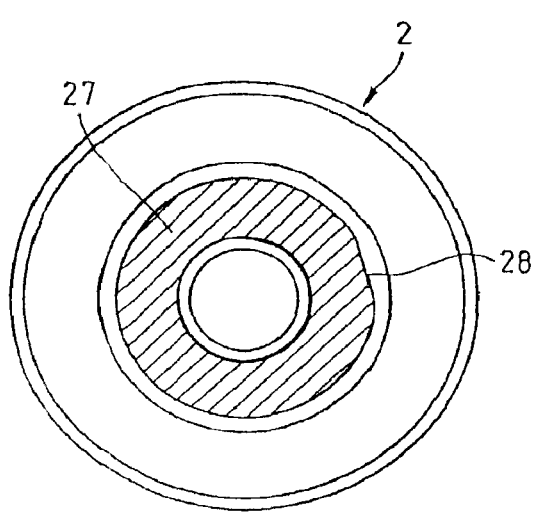
FIGS. 9A and 9B corresponding sections through a shaft according to the interchangeable head from FIGS. 7 and 8.
Figure 9B:
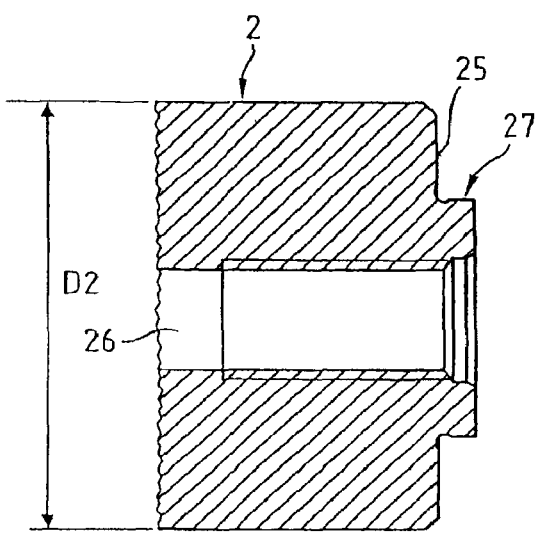

FIG. 9 shows corresponding sections through a shaft corresponding to the interchangeable head from the FIGS. 7 and 8. The connection element on the shaft 27 is essentially circularly symmetrical, with a planarly machined sector, thus, a plane surface on the shaft periphery 28. The connection element in the axial direction projects, for example, by approximately 1 to 2 or 4 mm beyond the end-side plane surface 25 of the shaft 2. The catch segment 51 and the plane surface on the shaft periphery 28 must be aligned to one another for the assembly of the interchangeable head 1 and the shaft 2.

FIG. 10 shows a cut-out of connection elements of interchangeable head and shaft according to a further embodiment of the invention. The connection element on the shaft 27 and accordingly the cutout 50 on the interchangeable head 1, are shaped as a rounded triangular cylinder projection and socket respectively. The connection element on the shaft 27 is slightly smaller than the cutout 50, so that, firstly, a loose connection may be created. FIG. 10, for illustration, shows a greatly exaggerated size difference. On assembly or on operation of the machine reaming tool, contact points 53 arise due to the mutual rotation of the interchangeable head 1 and the shaft 2.

Figure 11A:
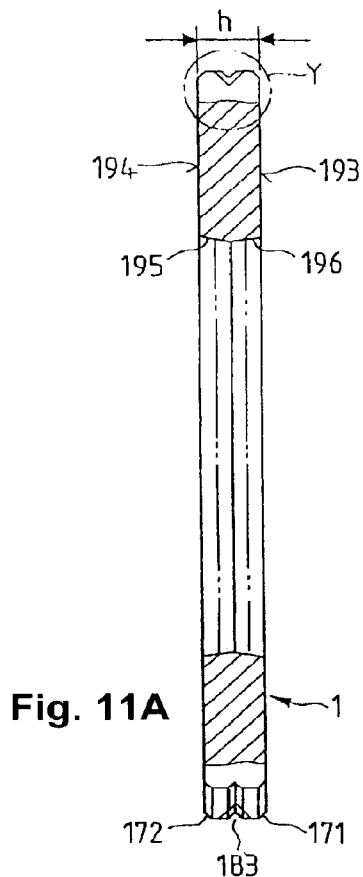
FIGS. 11A and 11B an interchangeable head designed as a reversible insert, in a partly sectioned lateral view and a detailed view.
Figure 11B:
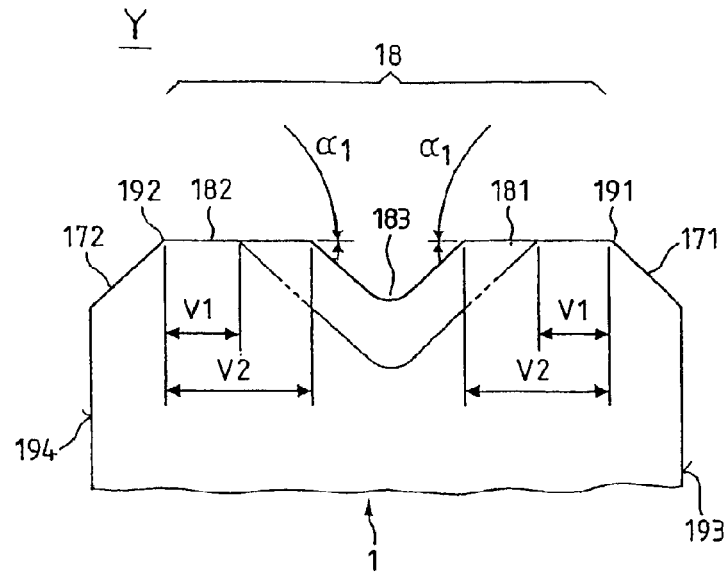

FIG. 11 shows an interchangeable head designed as a reversible insert, in a partly cut-open lateral view and a detailed view Y. The guide portion 18 has a first taper 181 and a second taper 182, which in each case lead to the middle of the cutter 16 from the first reaming corner 191 and from the second reaming corner 192 respectively. The diameter of the edge of the cutter 16 thereby reduces towards the middle, wherein the angle $\alpha_1$ between the edge and a connection line between the first reaming corner 191 and the second reaming corner 192 is a few hundredths of a degree. This corresponds to a diameter change of about 0.01 mm per 10 mm in the axial direction.

A groove 183 is preferably arranged between the two tapers 181, 182. This simplifies the manufacture, for example, the grinding of the surfaces corresponding to the tapers 181, 182. A length of the tapers 181, 182 between the groove 183 and the reaming corners 191, 192 is, for example, 0.5 or 1 mm in each case, which is shown in FIG. 11 by the lengths V1 and V2.

A first leading cut portion 171 leads from a first reaming corner 191 to a first plane surface 193, and from the second reaming corner 192, a second leading cut portion 172 leads to a second plane surface 194. The two leading cut portions 171, 172 are provided for cutting, thus they have a back-off clearance, or clearance angle or clearance relief 173, which means that the radius of the cutting tooth 16 along the periphery reduces behind the cutting edge. Ground surfaces which form the clearance relief 173 are shown in FIG. 15. The leading cut portions 171, 172 typically have an angle of 45° to the plane surfaces 193, 194, but may also be inclined to a greater or lesser extent.

FIG. 12 shows a lateral view in cross section and a plan view of a reversible insert according to FIG. 11. The cutters 16 therein are represented in a simplified manner. The reversible interchangeable head 1 comprises first connection means 197 and second connection means 198, wherein each of these connection means consists of a set of through-holes with sinkings 14 for accommodating a screw head. These sinkings 14 with the first set of holes are arranged on the first plane surface 193, and with the second set of holes are arranged on the second plane surface 194.

A first conical socket 195 leads from the first plane surface 193 and a second conical socket 196 leads from the second plane surface 194, coaxially to the axis of the interchangeable head 1 into the interchangeable head 1, for centring the interchangeable head 1. In a first fastening position of the interchangeable head 1 on the shaft, the first plane surface 193 is the front one, and the second plane surface 194 and the first conical socket 195 are held or pressed against the shaft 2 by way of screws through the first set of holes 197. The interchangeable head 1 is turned over in a second fastening position, so that the second plane surface 194 is the front one, and the first plane surface 193 and the second conical socket 196 are pressed against the shaft 2.

On using the interchangeable head 1 in the first fastening position, the first reaming corners 191 of the cutters 16 are worn. What is surprising is the fact that with this, the subsequent second reaming corners 192 are not significantly worn. The interchangeable head 1 is turned over when the first reaming corners 191 have been worn to such an extent that the demanded dimension is no longer achieved after the reaming, typically by a few hundredths of a millimeter.

Figure 13A:
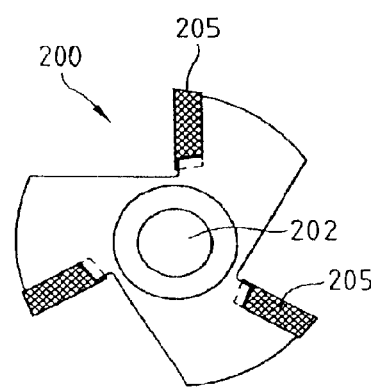
FIGS. 13A, 13B, 13C front, sectional and side views of a pre-machining tool for placing on the interchangeable head.
Figure 13B:
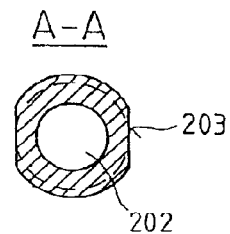
Figure 13C:
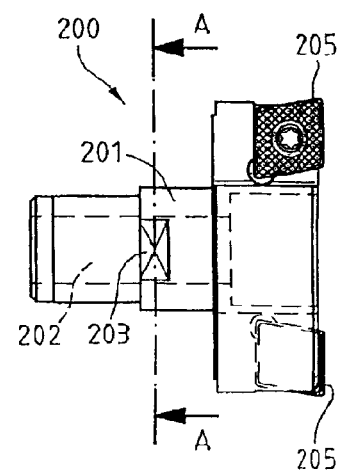
Figure 15A:
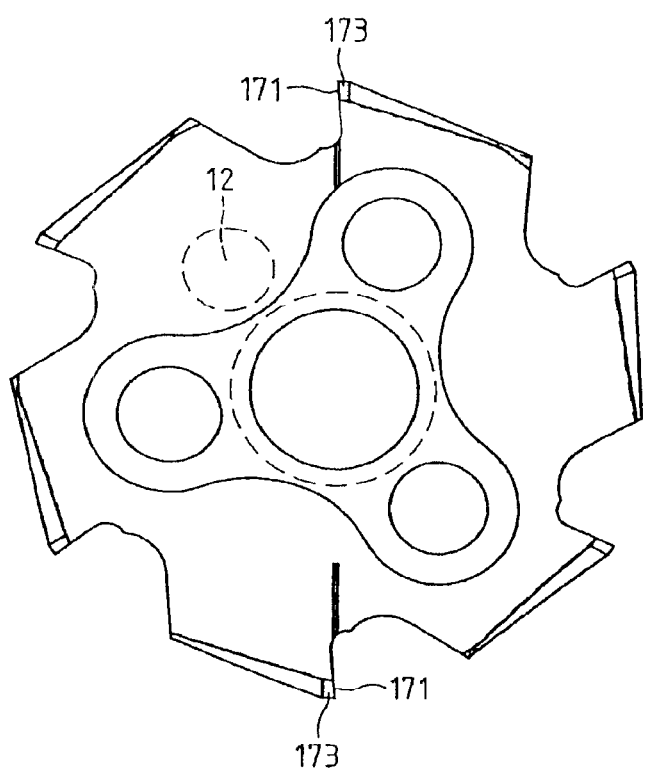
FIGS. 15A, 15B, 15C, 15D an interchangeable head designed as a combined reaming head and miller, in a partly sectioned lateral view and a plan view and detailed sectional views.
Figure 15B:
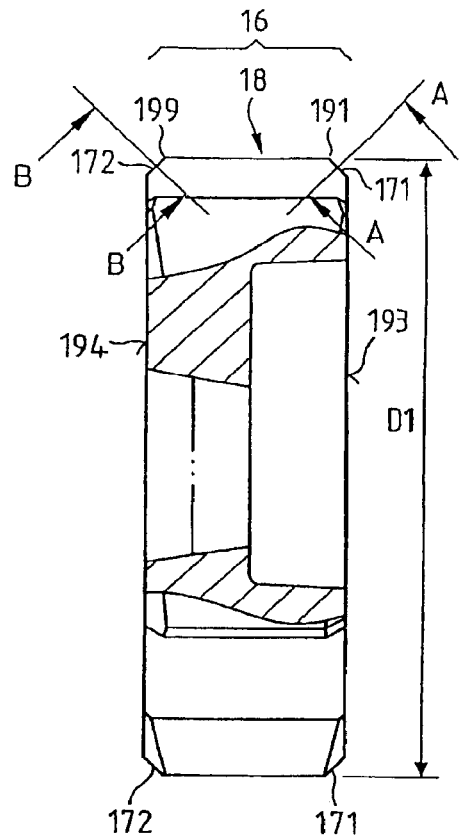
Figure 15C:
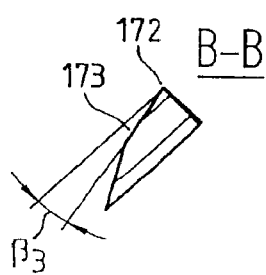
Figure 15D:
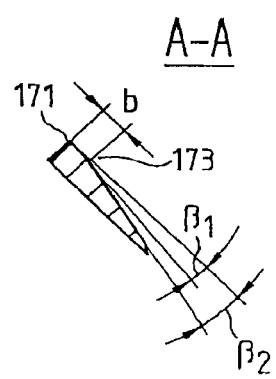

FIG. 13 shows a pre-machining tool 200 for attachment on an interchangeable head. The premachining tool 200 in the following is indicated as a planisher 200. It has a slightly smaller premachining diameter D3 or preliminary dimension than the end dimension according to the interchangeable head diameter D1. The planisher 200 shown in the Figure comprises individual reversible inserts 305 for machining with material removal, and is fastened to the same shaft 2 as the interchangeable head 1 by way of a shaft 201 of the planisher 200. In addition, the shaft 201 of the planisher 200 comprises two plane surfaces 203, and an axial sinking in the shaft 2 is shaped corresponding to this, for an improved torque transmission.

FIG. 14 represents a shaft 2 with an interchangeable head 1 assembled thereon and a planisher 200. The interchangeable head 1 for this comprises a set of through holes for receiving sunk screws as in the FIG. 5 or 12. The screws run essentially parallel to the axis of the shaft 2. The planisher 200 is held by way of a centric screw 204 and is tightened against the interchangeable head 1 in the axial direction. The screw 204 is led through a bore 202 in the planisher 200 and is screwed in the shaft 2.

FIG. 15 shows an interchangeable head designed as a combined reaming head and miller, in a partly sectioned open view and plan view. As already described in the context of FIG. 11, here too the two leading cut portions 171,172 of a cutter 16 or tooth 16 are provided for cutting or machining, and, thus, have a clearance relief or back-off clearance 173. In the embodiment of the invention according to FIG. 15, the first leading cut portion 171 leads from the first plane surface 193 to the first reaming corner 191 and from there, the guide portion 18 leads with a slight tapering to an oppositely lying corner which in this case is indicated as a milling corner 199. The second leading cut portion 172 leads from the milling corner 199 to the second plane surface 194.

In contrast to the embodiment according to FIG. 4 where the edge between the cutter 16 and the shaft-side plane surface 15 is only broken by a chamfer, here the edge arising by way of the chamfering is designed as a cutting leading cut edge 172 with a back-off clearance 173. The cutter 16 is formed on a first as well as second side of the interchangeable head 1. One may for example mill a chamfer on the edge of the exit hole with the second leading cut portion 172 for example after the reaming of a bore and the exit of the interchangeable head 1 from the bore. For this, the axis of the rotating interchangeable head 1 is moved on a circular path about the axis of the bore by way of interpolating milling or circular milling.

FIG. 15 in two sections shows a further preferred design of the two leading cut portions 171, 172. The section A-A shows a view of a first leading cut portion 171 in front of a reaming corner 191. In order to ensure a high mechanical strength of the first leading cut portion 171, it has a relatively small backslope angle $\beta_1$ of approximately 3° to 10°, preferably at least approximately 6°. The angle $\beta_1$ is measured with respect to a tangent to the leading cut portion 171. Preferably the back-off clearance 173 after a distance b to the cutting edge has a larger angle $\beta_2$, for example of 10° to 20°, preferably at least approximately 12°. The distance b is 0.05 mm or 0.1 mm to 1 mm, preferably at least approximately 0.25 mm, depending on the size of the interchangeable head 1.

The section B-B shows a view of a second leading cut portion 172 in front of the milling corner 199. Since no great demands are placed on the precision of the miller as on the reaming function, a single back-off clearance surface 173 with a backslope angle $\beta_3$ of 10° to 20°, preferably at least approximately 12° is sufficient.

FIGS. 16 and 17 in each case show corresponding views of semi-finished products 6 for interchangeable heads according to the invention. In particular, the connection elements, which means to say the first and second plane surface 193, 194, the conical socket 11 and the through holes with an optional pocket 14 for a screw head are completed and machined on the semi finished products 6. Only the cutters 16 need yet to be ground according to the specific requirements. The two FIGS. 16 and 17 show semi-finished products 6 for different diameters and with the same thickness of approximately 4.3 mm with different representational scales. The semi-finished product 6 of FIG. 16 has a diameter of 16 mm, that of FIG. 17 a diameter of 101 mm. Preferably however several interchangeable heads 1 with different diameters but with the same thickness $h_1$ form a set of interchangeable heads 1. The thickness $h_1$ preferably lies between 4 mm and 5 mm for all described embodiments.

LIST OF REFERENCE NUMERALS 1 reaming head, interchangeable head
11 conical socket
12 orientation hole
13 bore
14 pocket for screw head
15 shaft-side plane surface
16 cutter
17 leading cut portion
18 guide portion
2 shaft
21 conical projection
22 orientation pin
23 threaded bore
24 coolant channel
25 end-side plane surface
26 axial bore
27 connection element on the shaft
28 plane surface on the shaft periphery
3 head screw
50 cutout
51 catch segment
51 contact segment
53 contact point
6 semi finished product
171 first leading cut portion
172 second leading cut portion
173 back-off clearance
181 first taper
182 second taper
183 groove
191 first reaming corner
192 second reaming corner
193 first plane surface
194 second plane surface
195 first concial socket
196 second concial socket
197 first connection means 198 second connection means
199 milling corner
200 planisher
201 shaft of the planisher
202 bore
203 plane surface
204 screw
205 reversible insert

The invention claimed is:

1. A machine reaming tool, comprising:
   a shaft (2); and
   an exchangeable, single-piece interchangeable head (1), wherein the interchangeable head (1), in an axial direction and at each location, thus including the means for fastening the interchangeable head to the shaft, is thinner than a maximal thickness $h_{max}$, wherein this maximal thickness $h_{max}$ in millimeters is computed from a diameter D1 of the interchangeable head in millimeters as $h_{max}=6$ mm$+(1/10)\cdot$(D1$-12$ mm),
   wherein the interchangeable head (1), in a plane, shaft-side end-face (15) comprises a cutout (50) designed as a connection element, for the centering fastening of the interchangeable head (1) on the shaft (2),
   wherein the shaft (2) on an end-side plane surface (25) comprises a connection lug (21) projecting from said plane surface (25) in the axial direction, said lug corresponding to the cutout (50) of the interchangeable head (1),
   wherein the interchangeable head (1), at least in places, compresses the connection lug (21) of the shaft (2) when pressing the interchangeable head (1) against the shaft (2) in the axial direction,
   wherein on the interchangeable head (1), the cutout (50) formed as a connection element forms an axially central conical socket (11) for centering the interchangeable head (1) on the shaft (2), and the connection lug is a corresponding conical projection (21) on the shaft (2), and
   wherein the interchangeable head (1) does not comprise an axially projecting lug for fastening the interchangeable head to the shaft.

2. A shaft (2) for a machine reaming tool, comprising:
   an essentially rotationally symmetrical shaft with an end-face plane surface (25),
   wherein the shaft (2) comprises a connection lug (21) projecting out of the plane surface (25), for assembly of an attachable interchangeable head (1), and
   wherein the connection lug is a conical projection (21) projecting from an end-side plane surface (25) of the shaft (20) in the axial direction by less than 4 mm.

3. The machine reaming tool according to claim 1, wherein a cutout, on the end-face of the interchangeable head which is distant to the shaft, forms a cutout for a screw head, such that the screw head may be sunk in the interchangeable head.

4. An interchangeable cutting head for a machine reaming tool, said interchangeable head being formed as one piece, wherein the interchangeable head (1) in the axial direction and at each location, thus including the means for fasteninq the interchangeable head to a shaft, is thinner than a maximal thickness $h_{max}$, wherein this maximal thickness $h_{max}$ in millimeters is computed from a diameter D1 of the interchangeable head in millimeters as $h_{max}=6$ mm$+(1/10)\cdot$(D1$-12$ mm), that the interchangeable head (1) in a plane, shaft-side end-face (15) comprises a cutout (50) designed as a connection element, for the centering fastening of the interchangeable head (1) on a shaft (2), that the cutout (50) forms an axially central conical socket (11) and that the interchangeable head (1) does not comprise an axially projecting lug for fastening the interchangeable head to a shaft.

5. The interchangeable cutting head according to claim 4, wherein a cutout, on the end-face of the interchangeable head which is distant to the shaft, forms a cutout for a screw head, such that the screw head may be sunk in the interchangeable head.

6. The shaft (2) according to claim 2, wherein the conical projection (21) projects from the end-side plane surface (25) of the shaft (2) in the axial direction by less than 2 mm.

7. The shaft (2) according to claim 2, wherein the connection lug (21) of the shaft is compressible at least in places by an interchangeable head (1) mounted on the shaft.

8. The shaft according to claim 2, further comprising several bores for receiving screws for fastening an interchangeable head, the bores being arranged around the connecting lug, the axial directions of the bores running in parallel to the axial direction of the shaft.

9. An interchangeable head (1) according to claim 4, wherein the interchangeable head (1) in the axial direction has a thickness of maximally 6 mm.

10. An interchangeable head (1) according to claim 4 wherein the interchangeable head (1) is manufactured of a material manufactured by sintering.

11. The interchangeable head of claim 10, wherein the material comprises one of the group of: hard metal, cermet, ceramic or CBN (cubic boron nitride).

12. An interchangeable head (1) according to claim 4 wherein the interchangeable head (1) comprises several continuous bores in the axial direction, each with a recess (14) for accommodating a screw head.

\* \* \* \* \*

UNITED STATES PATENT AND TRADEMARK OFFICE
CERTIFICATE OF CORRECTION

PATENT NO. : 7,748,934 B2  Page 1 of 1
APPLICATION NO. : 10/595700
DATED : July 6, 2010
INVENTOR(S) : Zumsteg et al.

It is certified that error appears in the above-identified patent and that said Letters Patent is hereby corrected as shown below:

On the Title Page, on page 2, Item (56), under "FOREIGN PATENT DOCUMENTS",
Line 6, delete "JP    5345221    12/1993".

On the Title Page, on page 2, Item (56), under "FOREIGN PATENT DOCUMENTS",
Line 8, delete "JP    7040141    2/1995".

Signed and Sealed this

Twenty-sixth Day of October, 2010

David J. Kappos
*Director of the United States Patent and Trademark Office*